US006928407B2

(12) United States Patent
Ponceleon et al.

(10) Patent No.: US 6,928,407 B2
(45) Date of Patent: Aug. 9, 2005

(54) SYSTEM AND METHOD FOR THE AUTOMATIC DISCOVERY OF SALIENT SEGMENTS IN SPEECH TRANSCRIPTS

(75) Inventors: Dulce Beatriz Ponceleon, Palo Alto, CA (US); Savitha Srinivasan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 666 days.

(21) Appl. No.: 10/109,960

(22) Filed: Mar. 29, 2002

(65) Prior Publication Data

US 2003/0187642 A1 Oct. 2, 2003

(51) Int. Cl.$^7$ ............................ G10L 15/04; G06F 17/27
(52) U.S. Cl. ............................ 704/253; 704/254; 707/7
(58) Field of Search ............................ 704/9, 252, 253, 704/254, 255, 256, 257, 270; 707/2, 7

(56) References Cited

U.S. PATENT DOCUMENTS

| | | | |
|---|---|---|---|
| 5,371,807 A | | 12/1994 | Register et al. |
| 5,664,227 A | * | 9/1997 | Mauldin et al. ............ 715/516 |
| 5,708,767 A | | 1/1998 | Yeo et al. |
| 5,732,260 A | | 3/1998 | Nomiyama |
| 5,835,667 A | * | 11/1998 | Wactlar et al. ............ 386/96 |
| 5,990,980 A | | 11/1999 | Golin |
| 6,104,989 A | * | 8/2000 | Kanevsky et al. ............ 704/9 |
| 6,314,399 B1 | * | 11/2001 | Deligne et al. ............ 704/257 |
| 6,424,946 B1 | * | 7/2002 | Tritschler et al. ............ 704/272 |
| 6,529,902 B1 | * | 3/2003 | Kanevsky et al. ............ 707/5 |
| 6,636,238 B1 | * | 10/2003 | Amir et al. ............ 715/730 |
| 6,714,909 B1 | * | 3/2004 | Gibbon et al. ............ 704/246 |

OTHER PUBLICATIONS

Slaney et al., "Hierarchical segmentation using latent semantic indexing in scale space," 2001 IEEE International Conference on Acoustics, Speech, and Signal Processing, May 7–11, 2001, vol. 3, pp. 1437 to 1440.*

Yamron et al., "Event tracking and text segmentation via hidden Markov models," 1997 IEEE Workshop on Automatic Speech Recognition and Understanding, Dec. 14–17, 1997, pp. 519 to 526.*

Takao et al., "Segmentation and classification of TV news articles based on speech dictation," TENCON 99. Proceedings of the IEEE Region 10 Conference. Sep. 15–17, 1999, vol. 1, pp. 92 to 95.*

S. Dharanipragada, M. Franz, J.S. McCarley, S. Roukos, T. Ward, "Story Segmentation and Topic Detection for Recognized Speech", {\em Proceedings of Eurospeech}, Budapest, Hungary, Sep. 1999, pp. 2435–2438.

James Allan, "Topic Detection and Tracking Pilot Study Final Report," DARPA Broadcast News Transciption and Understanding Workshop, Feb. 1998.

* cited by examiner

*Primary Examiner*—Martin Lerner
(74) *Attorney, Agent, or Firm*—Samuel A. Kassatly

(57) ABSTRACT

A system and associated method automatically discover salient segments in a speech transcript and focus on the segmentation of an audio/video source into topically cohesive segments based on Automatic Speech Recognition (ASR) transcriptions. The word n-grams are extracted from the speech transcript using a three-phase segmentation algorithm based on the following sequence or combination of boundary-based and content-based methods: a boundary-based method; a rate of arrival of feature method; and a content-based method. In the first two segmentation passes, the temporal proximity and the rate of arrival of features are analyzed to compute an initial segmentation. In the third segmentation pass, changes in the set of content-bearing words used by adjacent segments are detected, to validate the initial segments for merging them, to prevent over-segmentation.

22 Claims, 13 Drawing Sheets

$S_2 \equiv$ good fit, $S_1, S_3 =$ not good fit

SYSTEM AND METHOD FOR THE AUTOMATIC DISCOVERY OF SALIENT SEGMENTS IN SPEECH TRANSCRIPTS

FIELD OF THE INVENTION

The present invention relates in general to the field of automated information retrieval. More specifically, it relates to the implementation of a system and associated method for the automation of discovery of salient segments or topics in speech transcripts exemplified by lectures for distributed/distance-learning environments, corporate training videos or DVDs, broadcast news stories, close-captioning, or on-line multimedia information. This invention utilizes multiple sources of information such as, but not limited to, text and speech from internet, newswire, radio and television news broadcast programs.

BACKGROUND OF THE INVENTION

The rapidly-growing amount of on-line information makes it necessary to support browsing of information where the underlying conceptual structure is revealed. This compliments query driven approaches that focus on content specific queries for information retrieval. The existence of both, manual and automatic text categorization schemes on the World Wide Web provide compelling evidence that such schemes are both, useful and important. Advances in storage, computing power, and bandwidth, result in increasing deployment of streaming video in applications such as workplace training, distance education, entertainment, and news. Despite the connectivity offered by the Web, the primary reason that audio-visual data is not ubiquitous yet is the set of challenges encountered in dealing with the unstructured, space-time nature of audio and video. Therefore, cataloguing and indexing of audio and video has been universally accepted as a step towards enabling intelligent navigation, search, browsing and viewing of speech transcripts and video.

Speech recognition systems output the most probable decoding of the acoustic signal as the recognition output, but keep multiple hypotheses that are considered during the recognition process. The multiple hypotheses at each time, often known as N-best lists, provide grounds for additional information for retrieval systems. Recognition systems generally have no means to distinguish between correct and incorrect transcriptions, and a word-lattice representation (an acyclic directed graph) is often used to consider all hypothesized word sequences within the context. The path with the highest confidence level is generally output as the final recognized result, often known as the 1-best word list.

Speech recognition accuracy is typically represented as Word Error Rate (WER) defined to be the sum of word insertion, substitution and deletion errors divided by the total number of correctly decoded words. It has been shown that WER can vary between 8–15% and 70–85% depending on the type of speech data and tuning of the recognition engine. The 8–15% error rates typically correspond to standard speech evaluation data and the 70–85% corresponds to "real-world" data such as one-hour documentary and commercials. Retrieval on transcripts with WER of 8–30% has been reported to yield an average precision of 0.6–0.7. However, for real-world audio with high WER of 70–80%, the precision and recall have been reported to drop dramatically to 0.17 and 0.26, respectively.

The National Institute of Standards and Technology (NIST) sponsored Text Retrieval Conference (TREC) has implemented a Spoken Document Retrieval track to search and retrieve excerpts from spoken audio recordings using a combination of Automatic Speech Recognition and information retrieval technologies. The TREC Spoken Document Retrieval task has conducted a set of benchmark evaluations and has demonstrated that the technology can be applied successfully to query audio collections. The best retrieval results report a precision between 0.6 and 0.7, and yield 82–85% overall performance of a full-text retrieval system.

Currently, there are three primary basic forums where the automatic assignment of topics to unstructured documents has been extensively researched: Statistical Machine Learning, Topic Distillation on the Web, and the DARPA sponsored Topic Detection and Tracking (TDT) track. Statistical Machine Learning literature refers to this task as text categorization, and partitions it into supervised and unsupervised methods. Supervised text categorization refers to the automatic assignment of topics to text collections when sample training data is available for each topic in a pre-defined topic set. Unsupervised text categorization methods do not use a predefined topic set with sample training data; instead, new documents are assigned topics following an unsupervised training phase. Query-driven topic identification, often referred to as Topic Distillation has received a lot of attention with the ubiquity of the Web. These approaches are based on connectivity analysis in a hyper-linked environment, together with content analysis to generate quality documents related to the topic of the query.

Topic Detection and Tracking or TDT, finds new events in a stream of broadcast news stories. The TDT project builds on, and extends the technologies of Automatic Speech Recognition and Document Retrieval with three major tasks: (1) segmenting a stream of data into topically cohesive stories; with the data comprising news wire and textual transcriptions (manual, automatic, or both) of audio; (2) detecting those news stories that are the first to discuss a new event occurring in the news; and (3) given a small number of sample news stories about an event, finding all following stories in the stream.

In this context a topic is defined to be "a seminal event or activity, along with all directly related events and activities". The segmentation task is performed on several hundred hours of audio either using the audio signal, or the textual transcriptions of the audio signal. The tracking task associates incoming stories with target topics defined by a set of training stories that discuss the topic.

In the early stages of TDT development, work on text segmentation was based on semantic word networks, vector space techniques from information retrieval, and decision tree induction algorithms. Since then, several new techniques were successfully applied to text segmentation. One such approach was based on treating topic transitions in text stream as being analogous to speech in an acoustic stream. Classic Hidden Markov Model (HMM) techniques were applied in which the hidden states are the topics and observations are words or sentences.

A second approach has been to use content-based Local Context Analysis (LCA) where each sentence in the text is run as a query and the top 100 concepts are returned. Each sentence is indexed using offsets to encode positions of the LCA concepts and these offsets are used as a measure of vocabulary shifts over time.

A third approach has been to combine the evidence from content-based features derived from language models, and lexical features that extract information about the local linguistic structure. A statistical framework called feature induction is used to construct an exponential model which assigns to each position in the text a probability that a segment boundary belongs at that position.

In general, clustering methods such as agglomerative clustering have been used for the segmentation task. Initially, a fixed length window is considered to be a cluster, and a similarity score is computed for all pairs of neighboring clusters. If the most similar pair of clusters meets a threshold, the two clusters are combined to form a new cluster. This process is repeated until no pairs of neighbors meet the similarity threshold.

Applications that incorporate some form of automatic video categorization based on an analysis of the speech transcripts have been focused on broadcast news content. The Informedia Digital Video Library (a research project initiative at Carnegie Mellon University funded by the NSF, DARPA, NASA and others) includes a supervised topic-labeling component where a kNN classification algorithm is used to categorize incoming stories into one of 3000 topic categories. An HMM approach has been shown to be better than a naive Bayesian approach for the classification of news stories into a static set.

Much of the research literature addresses topic discovery for large document collections. The problem addressed by this invention bears the largest similarity to the TDT segmentation task. However, there are several important differences that are relevant to the problem domain addressed herein. TDT is fed with a relatively homogeneous corpus of broadcast news audio, and therefore, the notion of a 'story' and the associated segment is relatively well defined.

In contrast, the problem addressed by the present invention is that the various distributed learning and corporate training videos or DVDs, where the duration of audio ranges between 10 and 90 minutes each. Segmentation based on cohesion of topics can be subjective, and is not as unambiguously defined as in news stories. Initial TDT results on imperfect transcripts obtained from speech recognition have not been as good as those on carefully transcribed broadcast news text. This is particularly true with a speech recognition accuracy that varies from 35–60% Word Error Rate (WER), depending on fidelity of audio, background noise, and professional versus amateur speaker.

SUMMARY OF THE INVENTION

The present invention addresses the problem of automatic detection of salient audio segments for applications, such as corporate training based on associated speech transcriptions. The disclosed method deals with the segmentation of any generic time-varying signal where the features occur at varying points in time. It focuses on the segmentation of an audio/video source into topically cohesive segments based on Automatic Speech Recognition (ASR) transcriptions where the features are recognized words with associated timestamps.

The first step in this process is to extract the features associated with the time-varying signal, in this case, word n-grams from the ASR text. The word n-grams are extracted from the imperfect speech transcriptions using a three-phase (or pass) segmentation algorithm. The segmentation algorithm is based on the following sequence or combination of boundary-based and content-based methods: a boundary-based method; a rate of arrival of feature method; and a content-based method.

In the first two segmentation passes or methods, the temporal proximity and the rate of arrival of the first and second passes is computed by using the features as queries in an information retrieval system to obtain time stamps for their occurrences. In the third segmentation pass or method, changes in the set of content-bearing words used by adjacent segments are detected. This content-based segmentation method validates the initial segments and merges them as needed, to prevent oversegmentation. These segmentation methods are therefore used to obtain the temporal cohesiveness of the information as well as the association of the features to the segments.

A valuable tool in this domain is the ability to automatically segment the audio/video source and to assign a meaningful textual label to the segments. The labeled segments may then be used as a navigational tool, as indices that yield a higher semantic level of indexing in comparison with keyword indexing, and as discriminatory/ranking information towards automatic generation of audio/video summaries and tables of contents.

As an additional feature, the three-phase scheme is unsupervised and requires no training data. In the first phase, the present system uses n-grams for video data and a mixture of n-grams and content words/and noun phrases as a feature set to alleviate the problem of noisy features due to inaccurate speech transcriptions. The system accounts for the temporal distribution of the features along with changes in the rate of arrival of the features, as parameters to trigger an initial two-phase (i.e., first and second passes) segmentation. In the event that an information retrieval system is not available, it is possible to use a string match (i.e., an exact or fuzzy index match) or a phonetic match (i.e., a phonetic index) of a transcript.

In the second phase, it is possible to modify the features (n-grams or technical terms) based on the genre of the input signal. For example, if the input signal relates to the following genre: a technical talk, educational video, training presentation, the minimum features (technical terms) within a segment could be set to, for example 15 to 20 n-grams for a video that is approximately 1 hour long. However, if the input signal relates to the following genre: news broadcast, radio program, phone calls, congressional hearings, the minimum features in the segment are set equal to all the technical terms used plus a predefined number of top content bearing words, for examples 5 to 15 words. In this case the duration of the source video could be shorter than one hour long.

In the third phase, the content-based method, which is similar to a local context analysis, is used to merge the generated segments and to prevent oversegmentation.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
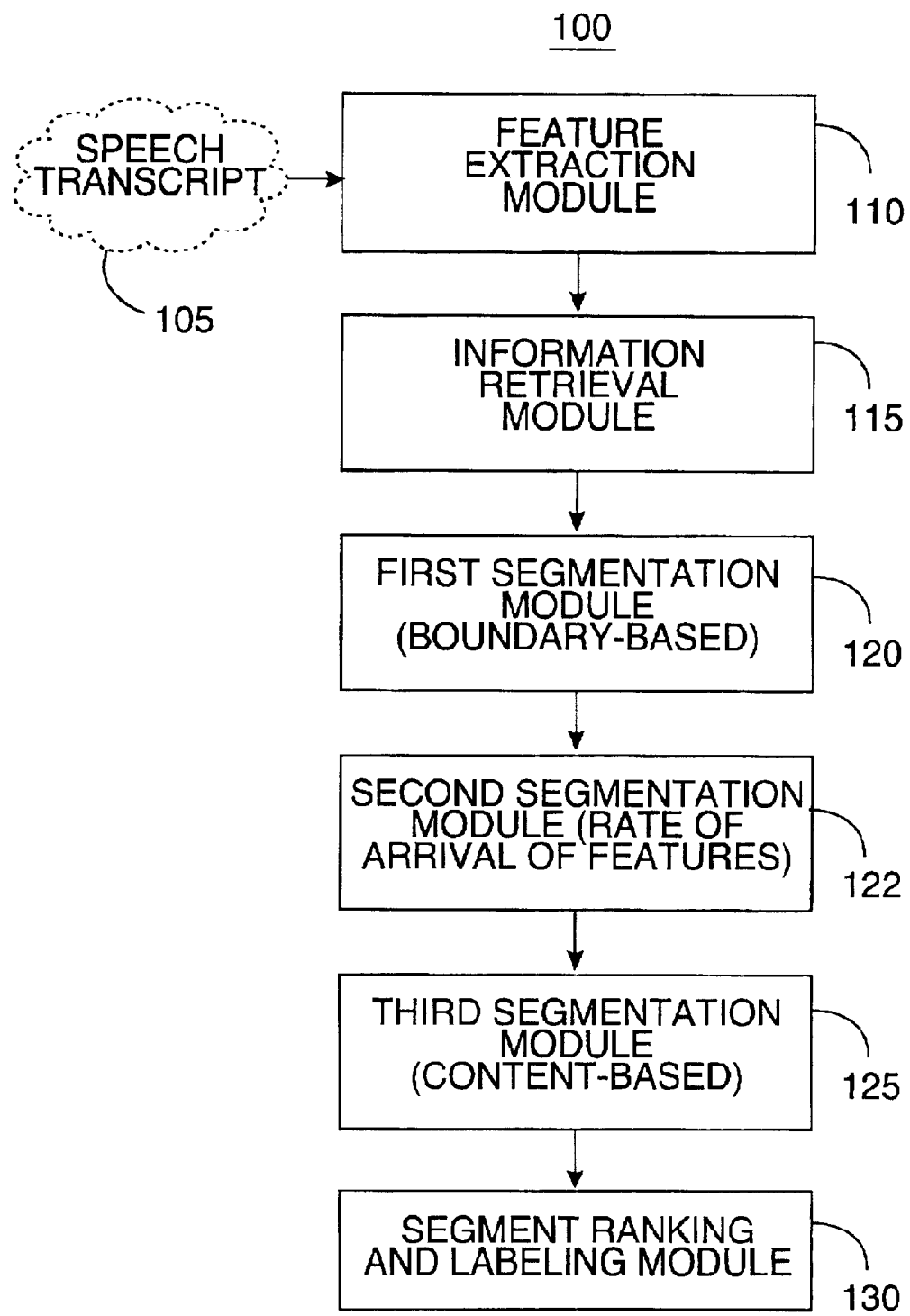
FIG. 1 is a high level block diagram illustrating the architecture of a salient segment discovery system of the present invention.

The following definitions and explanations provide background information pertaining to the technical field of the present invention, and are intended to facilitate the understanding of the present invention without limiting its scope:

k Nearest Neighbor: (kNN) classification is an instance-based learning algorithm that has been applied to text categorization since the infancy of the research. It has been shown to yield better results than those produced by other Machine Learning algorithms. In this classification model, k number of nearest neighbors of a test document is computed first. Then the similarities of this document to the k nearest neighbors are aggregated according to the class of the neighbors, and the test document is assigned to the most similar class (as measured by the summative similarity). A major drawback of the similarity measure used in kNN is that it weighs all criteria equally in computing similarities. When used with a small subset of words useful for classification, it can lead to poor similarity measures and produce errors in classification.

Naive Bayesian: The naive Bayesian (NB) algorithm has been widely used for document classification, and has proven to perform very well. For each document, the naive Bayesian algorithm computes the subsequent/posterior probability that the document belongs to different classes and assigns it to the class with the highest subsequent/ probability. The naive Bayesian algorithm models each document as a vector in the term space. The approximate class priors are computed using the maximum likelihood estimate given a set of training documents. The probability is computed by assuming that when conditioned on a particular class, the occurrence of a particular value is statistically independent of the occurrence of any other value in any other term. Because of this assumption, this classifier is called "naive" Bayesian.

Hidden Markov Models: (HMMs) provide a powerful, well-distinguished method for speech recognition. A HMM is built and trained to optimize the probability that it generates a desired acoustic signal. In a conventional HMM, the probability that a particular acoustic vector is produced by a particular state depends only on that state and is conditionally independent of the past. This is called the independent-output assumption and almost certainly does not reflect the true character of the speech pattern, which at any instant is relatively connected with following and preceding events. HMMs offer a computationally practical way to model convoluted, time-based processes like speech; however, they rely on a series of hypotheses about the speech process which may be inaccurate at times. A HMM makes an unconditional assumption that the array of auditory parameters is at the very least adequate if not optimal. These parameters are representations of the acoustic signal, chosen before any training or classification to preserve the semantic information in the speech signal while radically reducing the dimensionality; characteristically, 20 ms of speech data is encoded into 26 parameters. It should be noted that in recent history, primary ASR progress has consisted of tuning and patching HMM systems to overcome some of their more flagrant restrictions.

n-gram: In hidden-event n-gram Language Model (LM), the states of the HMM consist of the end-of-sentence status of each word (boundary or no-boundary), plus any preceding words and possibly boundary tags to fill up the n-gram context. Transition probabilities are derived from n-gram probabilities estimated from boundary-tagged training data. For example, the 2-gram (bigram) parameter $P((s)|story)$ gives the probability of a sentence boundary following the word "story". HMM Observations consist of only the current word portion of the underlying n-gram state, constraining the state sequence to be consistent with the observed word sequence.

Segmentation refers to segmenting a data stream from a source into topically cohesive stories. Text (newswire) sources are already supplied in segmented form; therefore, segmentation applies only to the audio component of the TDT corpus (radio and TV). Segmentation of audio signals may be performed directly by using the audio signal itself or indirectly by using the provided automatic textual transcriptions of the audio signal. Performance depends on the nature of the source (i.e. text or audio) and on the maximum time allocated for the segmentation process.

Topic Tracking is an abstraction of a hypothetical TDT system. Its objective is to track user-defined events of some interest in future stories. The system uses these events to "learn" what the story is about by memorizing its extracted feature, then alert the user when a new story is published about this event. Performance is affected by the number of training stories, the language of the training/test stories, and the quality of the transcripts automatically vs. manually generated transcripts.

Topic Detection is an abstraction of a story clustering TDT system. The objective of a detection system is to amalgamate stories that discuss the same event. In FIG. iii, the red rectangles represent stories about one event, and the green rectangles are stories that discuss another event. Clustering in TDT is done incrementally. That is for a given source file of stories, the system can look ahead only by a specified time period before making a final decision. Incremental clustering can be broken down into two phases: detecting when a new event is seen and putting stories about previous events into categorical clusters.

Speech Patterns: The detection or discovery of the speech patterns for the present algorithm is introduced by first identifying the types of boundary conditions between segments observed in practice as well as the density within a segment. Speech data from several speakers is examined.

Figure 6:
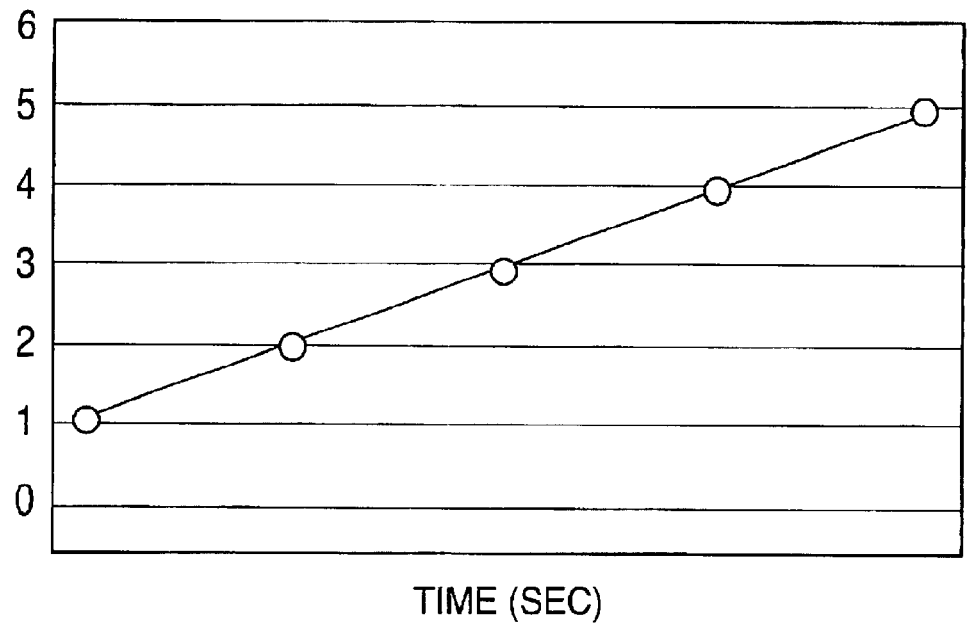
FIGS. 6 and 7 show exemplary categories of different speech patterns.

FIG. 6 shows a relatively homogeneous rate of arrival of features where the words are being spoken at a substantially constant rate. Segments with a high rate of arrival of features are considered to be content-rich. This is a reasonable assumption since n-grams features are generally content bearing.

In the first and second segmentation phases of the segmentation process of the present invention, the rate of arrival of the features (i.e., content bearing words, such as technical terms, that are relevant to the topic or subject matter being discussed or presented) is combined with the observed gaps in the temporal distribution of the features to compute the initial segment boundaries.

Figure 7:
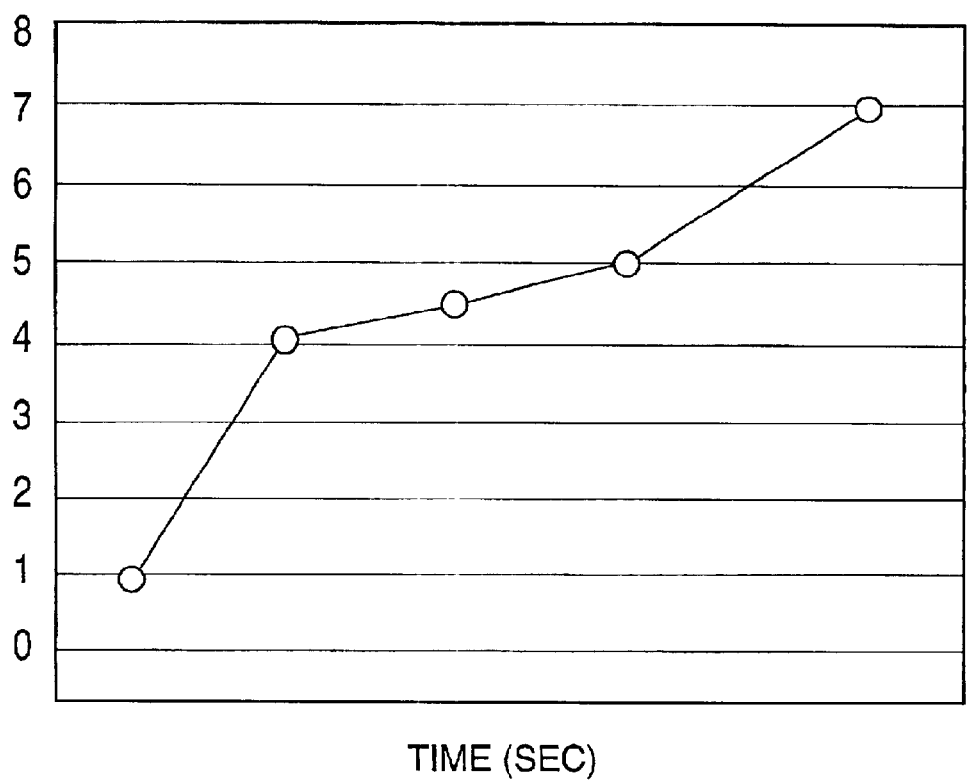

FIG. 7 illustrates an exemplary variable rate of arrival of features where, first, a rapid onset of features is seen, followed by a relatively slow pace, and finally, followed by another rapid onset. The change in rate of arrival of features is considered to be indicative of a possible shift in topics. This is based on the observation that when the speaker starts a new topic, he/she is likely to use technical terms or content-bearing words at a high rate. However, it is also possible to observe a sharp change in the rate of arrival of features, while discussing the same topic. The third segmentation phase addresses this issue.

As it will be described later in more detail, the third segmentation phase of the present segmentation algorithm (or method) examines the support feature set corresponding to adjacent segments. This segmentation uses a content-based method that updates the segment boundaries obtained in the first and second segmentation phases. The third segmentation phase does not generate additional segments, as its main goal is to consolidate initial segments into larger segments, if and when appropriate.

Referring now to FIG. 1, it generally illustrates the main components of a system 100 for automatically discovering salient segments or topics in a speech transcript 105. The system 100 generally includes a feature extraction module 110, an information retrieval module 115, a first segmentation module 120, a second segmentation module 122, a third segmentation module 125, and a segment ranking and labeling module 130.

The speech transcript 105 can originate, for example, from an audio track or any other source that preferably has an associated audio signal. The transcript 105 is fed to the feature extraction module 110.

The feature extraction module 110 mines the entire transcript 105 in search of word n-gram features, using natural language processing (i.e. parts of speech tagging, detection of non-stop words, etc) and taking into account global frequency counts for the entire speech transcript. The feature extraction module 110 will be described in more detail in connection with FIG. 2.

The information retrieval module 115 conducts a query of each word n-gram against a combined word and phonetic index to obtain the times of occurrence and corresponding probabilistic retrieval scores. In other words, the information retrieval module 115 provides the means for determining the temporal information associated to relevant features from a collection of documents, based on a user query, as it will be explained more fully in connection with FIG. 3.

Figure 4:
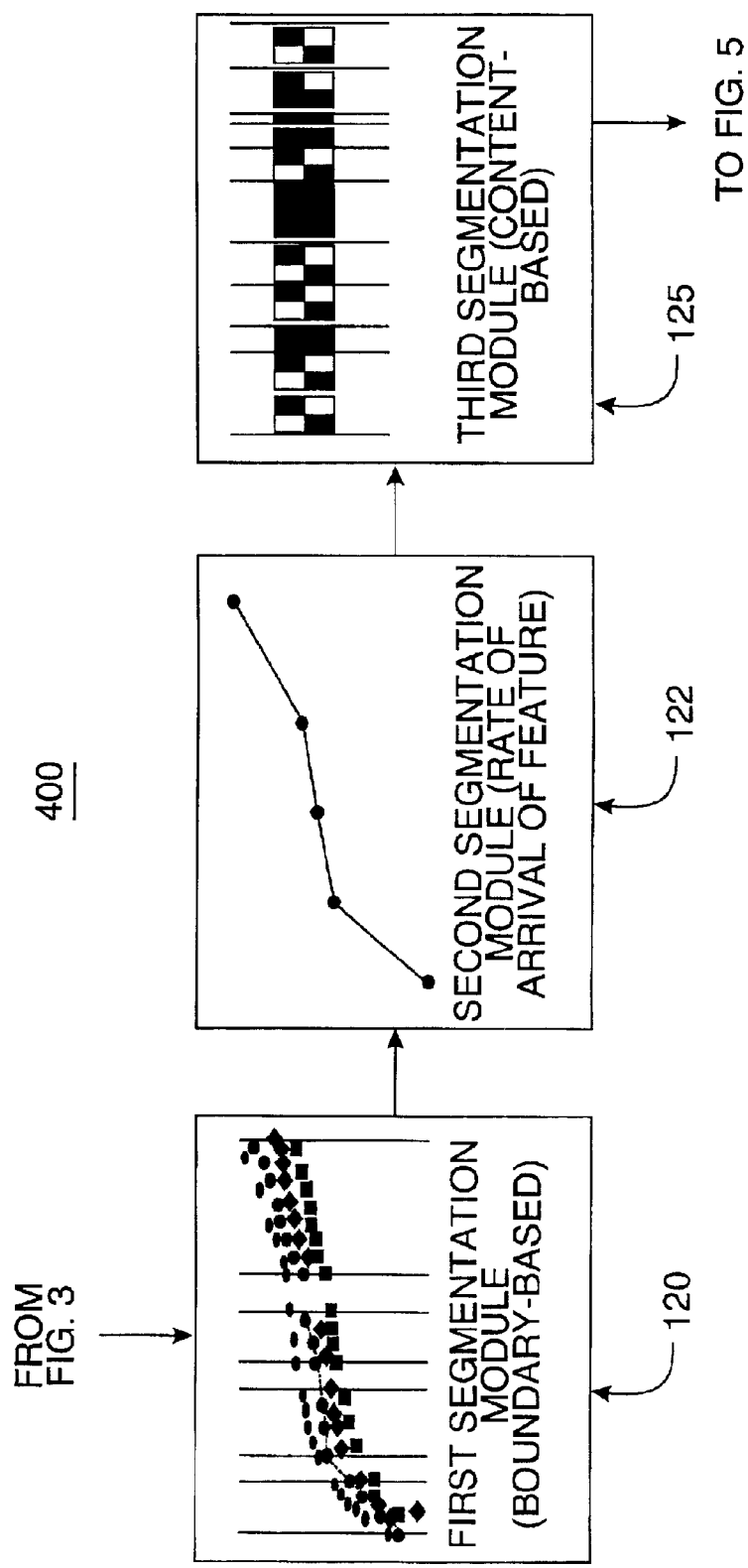
FIG. 4 is a high level block diagram describing a segmentation system that forms part of the salient segment discovery system of FIG. 1, shown comprised of three segmentation modules.

The first segmentation module 120 analyzes the temporal distribution of features, their rate of arrival and the relative distribution of gaps between features to compute the boundaries for the initial segments, as illustrated by block 120 of FIG. 4. This procedure will be explained later in more detailed in connection with method 800 of FIG. 8.

The second segmentation module 122 identifies new segments, using changes in the rate of arrival of the features. Characteristically, the rate of arrival of the features in a segment is presumed to be reasonably invariable. The second segmentation module 122 detects abrupt changes in the arrival rate of the features, and determines if the magnitude of these changes is significant enough to be considered a knot, that is a boundary between two segments. The rate of arrival of the features is illustrated by block 122 of FIG. 4.

The third segmentation module 125 validates or updates initial segment boundaries using content-based method by examining the temporal distribution of features within each segment and the intersection of the support features set of contiguous segments, as it will be described in connection with block 120 of FIG. 4.

The segment ranking and labeling module 130 assigns a probabilistic ranking of segments based on the density of the segment, the rank of every feature, and the score given by the retrieval step for each feature occurrence. The segment ranking and labeling module 130 will be described in connection with FIG. 5.

Figure 2:
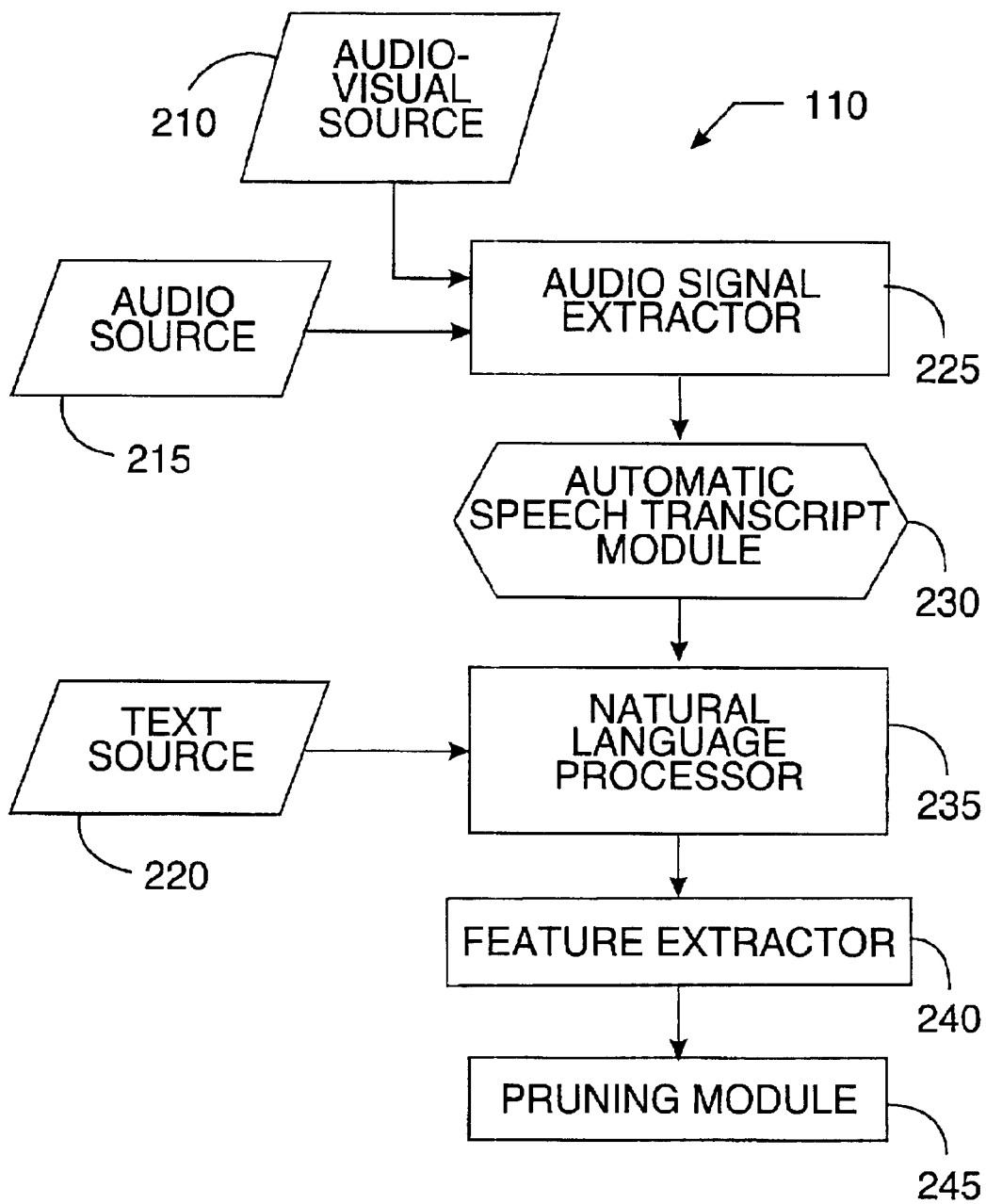
FIG. 2 is a high level block diagram illustrating a feature extraction module implemented by the system of FIG. 1.

Referring now to FIG. 2, it generally illustrates the components of the feature extraction module 110. The feature extraction module 110 includes an audio signal extractor 225 that receives various inputs, such as audio-visual signals from an audio-visual source 210, audio signals from an audio source 215, and/or textual material from a text source 220. One scenario where textual material is appropriate is closed-captioned. For example, TV programs will have closed-caption, so there is no need to generate a speech transcript. Another scenario is the notes taken in a court case.

For illustration purpose only, the audio-visual source 210 can be an audiovisual media such as a video documentary, a TV news program, or a corporate training video. The audio source 215 can be a taped interview, a news program, a lecture or professional notes, and/or any similar audio tape. The text source 220 can be, for example, a presentation slide.

The audio signal extractor 225 operates on the input sources 210, 215, 220, to extract the audio component of the input signal, and feed the extracted audio signal to an automatic speech transcript module 230.

The automatic speech transcript module 230 provides automated speech transcription, to automatically provide a textual representation from the audio input. The automatic speech transcript module 230 can also be referred to as automatic speech recognition (ASR) module.

The feature extraction module 110 further includes a natural language processor 235 that receives the transcribed text from the automatic speech transcript module 230 and/or input text from the text source 220. The natural language processor 235 processes the input text to perform parts of the speech tagging and to define regular expressions, in order to determine the technical terms.

The feature extraction module 110 also includes a feature extractor 240 that selects a single feature set of high frequency word n-grams along a time line. The word n-grams are identified in the speech transcript text by a cascaded sequence of natural-language processing tools and a technical term extractor. It is well recognized that multiword terms are mainly noun phrases containing adjectives, nouns and occasionally prepositions. Semantically, multi-word technical terms refer to important concepts defined or discussed in the document and in the domain covered by the corpus as a whole.

Linguistically, the word n-grams form a subset of the noun phrases occurring in the document. They are lexical, that is, their meaning is not usually derivable from the meanings of their component words (e.g., "landing gear" or "carbon fiber"). These phrases do not usually undergo other noun-phrase variations, such as insertion or deletion of modifiers. ("landing" or "the carbon" is not likely.) Technical terms typically include one or more simple modifiers preceding the head noun (e.g., "computing power" and "control system"), and infrequently contain one or more prepositional phrases following the head (e.g., "fly by wire"). Conjunctions (e.g., "and" or "or") verbs and adverbs in technical terms are rare.

The features extracted by the feature extractor 240 are fed to a pruning module 245. The feature extractor 240 identifies technical terms and scans the document tokens for all sequences of words that match grammatical structures in which technical terms tend to appear. The following regular expression can be used to extract such n-grams:

((Adj|Noun)⁺|((Adj|Noun)*(Noun–Prep))(Adj|Noun)*)Noun where:
"Adj" is an adjective, but not a determiner;
"Noun" is a noun, but not a pronoun;
"Prep" is a preposition;
"*" means zero or more occurrences; and
"+" means at least one occurrence.

In other terms, a candidate term is a multi-word noun phrase; and it either is a string of nouns and/or adjectives, ending in a noun, or it includes two such strings, separated by a single preposition. The part of speech of each word is determined by lookup in an online dictionary of English. Since many words in English have more than one part-of-speech, the procedure may extract sequences that are not truly noun phrases, such as "price rose." However, discarding technical terms that occur only once in a document removes many of these false phrases.

The pruning module 245 improves the feature set generated by the feature extractor 240, by eliminating less content bearing words or less differentiating features.

The feature selection represents the original speech transcript as a sparse, single dimensional vector of word n-gram features along the temporal dimension. The temporal component of the word n-grams implicitly models events such as non-speech or music, that tend to be longer when a topic change occurs.

Figure 3:
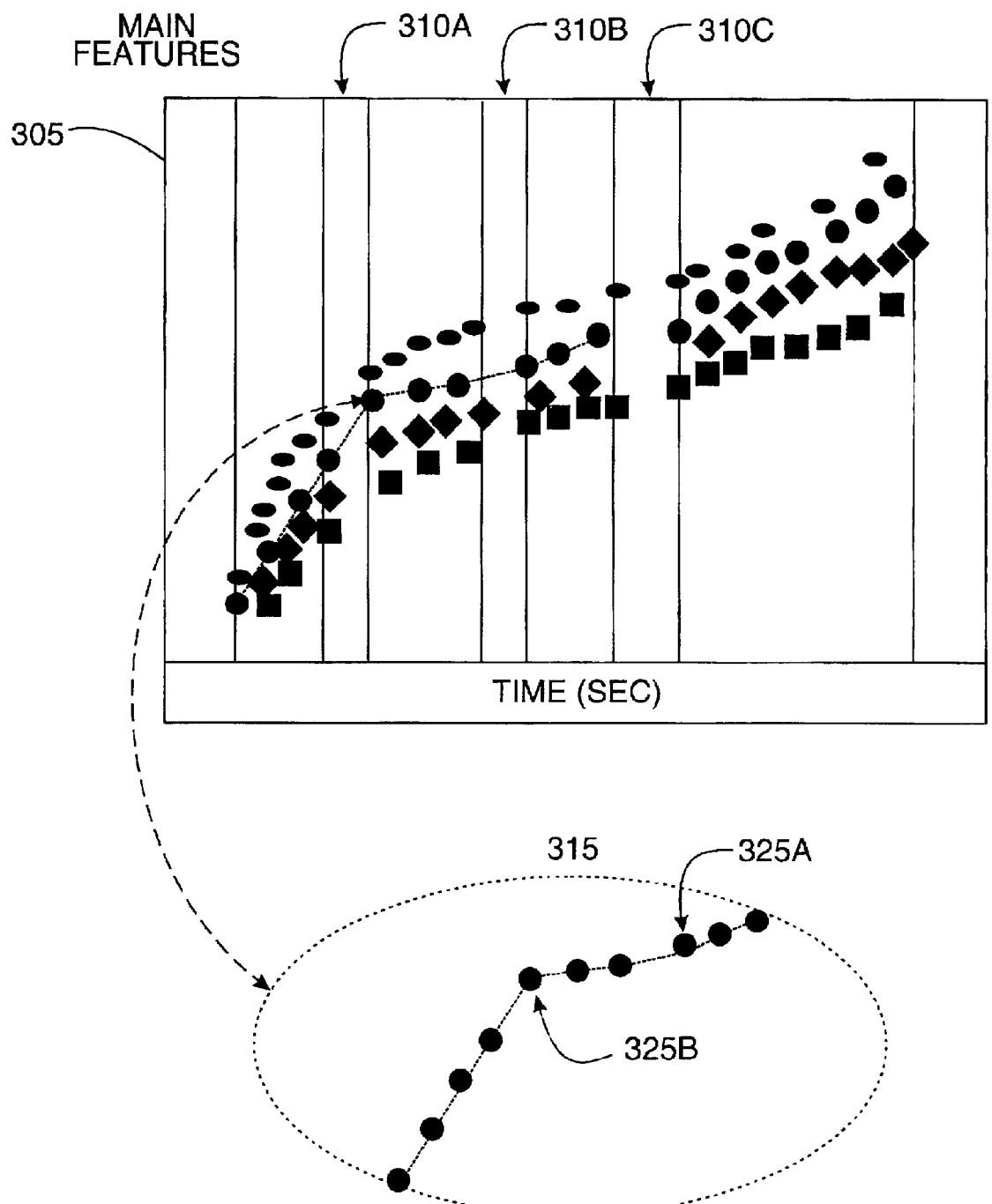
FIG. 3 is a graph of an exemplary temporal distribution of the features extracted by the feature extraction module of FIG. 2.

FIG. 3 illustrates a plot 305 of an exemplary temporal distribution of the word n-gram features extracted the feature extraction module 110 of FIG. 2. The feature extractor 240 time-stamps every feature. This is achieved by running each word n-gram as a query against a combined word and phonetic index to obtain the times of occurrence and corresponding probabilistic retrieval scores. Time offsets are sorted in ascending order.

In the example illustrated in FIG. 3, 75 time offsets are generated for four extracted features. Each feature is designated by a different shape. The vertical axis represents the main features or n-grams, while the horizontal axis represents time in seconds. Four distinct, non-linear curves are produced.

Three observations can be made from these curves, as follows:

Regions 310A, 310B, and 310C represent vertical gaps in the plots. These gaps are time intervals in which there are no identifiable features. If a gap is sufficiently large, it is assumed that it signifies a segment boundary.

Curve 315 illustrates a varying rate of arrival of one feature. The arrival rate of the features is combined with the observed gaps 310A, 310B, 310C in the temporal distribution of the features for the second segmentation module 122 (FIG. 1) to compute the initial segment boundaries.

Mathematically, a segment contains data that is closely approximated by linear splines. Knots or nodes 325A and 325B represent breaks between segments. Such segments are determined by computing a least-square fit of a linear function to the segments. Separate linear least-square fits are made to the first half and second half of the data. It follows that if a free knot exists with a good linear fit to both sections, then one of the halves are considered to be a good fit. Consequently, if both fits are poor, no further segmentation is made. If both fits are good, then the knot is at the midpoint. Otherwise, the knot lies in the half with the poor fit.

FIG. 4 illustrates a segmentation module 400 that comprises the first segmentation module 120, the second segmentation module 122, and the third segmentation module 125. The segmentation module 400 operates on the plot of the temporal distribution of graph 315 of FIG. 3.

An analysis of the arrival times of features reveals that the segments within an input source are characterized by an almost constant rate of arrival. The first segmentation module 120 analyzes the temporal distribution of the word n-gram features in graph 300 of FIG. 3. The first segmentation module 120 identifies the gaps 310A, 310B, 310C that do not contain features. If a gap is sufficiently large, it is assumed to signify a segment boundary. As used herein, the terms "sufficiently large" denotes a relative measurement with respect to the average gap in the arrival of features. To determine the average gap, the time difference between the arrival of the first feature and that of the last are computed and divided by the number of features.

In the following equation, let $g_i$ denote the gap between the arrival of $f_i$ and $f_{i+1}$, then a gap is considered sufficiently large if $g_i \geq K\overline{G}$, where $\overline{G}$ is the average or median gap, and K is a constant determined by doing a frequency analysis of the gaps in the arrival of features. In a preferred embodiment, if a high variance exists between the mean and the median gap, the median gap is selected in order to define the finest granularity of segmentation. An exemplary set of frequencies indicates that a choice of 5 would be suitable. When determining K, a gap size that appears to be an outlier is sought.

Having made an initial segmentation of the input signal, the same segmentation method can be applied to the new segments in an attempt to identify further segmentation boundaries or sub-segments. The stopping criteria for this method are: (1) no large gaps have been found, i.e. we have a high density segment; or (2) we reached a segment of minimum size.

The average gap in the arrival of features is bound to be smaller for at least one segment, and is typically smaller for all the segments, since sparse sections have been eliminated. Consequently, the test for a sufficient gap may reveal new segments even if the same relative constant K is still used.

While some gaps between segments may have no features, sometimes there exists protracted transition periods in which occasional features will arrive. Such transition periods may be at the beginning and at the end of the segment tentatively identified, or at other intermediate locations. These transition periods are characterized by an arrival rate much slower than in the segments. To identify such transition periods, the beginnings and ends of the segments identified so far are examined. The start and end of the segment are refined by eliminating any period in which the gap between features is greater than $\alpha K_s \overline{G_s}$, where s denotes the s-th segment, $\overline{G_s}$ the average arrival rate for that segment, and $\alpha$ is a constant, for example 0.6, that defines the size of the transition gap. These sparse arrival rates may be viewed as generalizing the definition of a gap to include j arrivals in a period greater than $m\overline{G_s}j$, with m being smaller than $K_s$.

Only the search for j=1 needs be done since larger sparse gaps with more features can be determined by extending a gap with a single feature. It is important that the search for new sparse sections be performed after all pure gaps have been identified and the end and beginning of the segments have been refined.

Having exhausted the search for gaps or sparse sections, the rate of arrival is examined by the second segmentation module 122 for the rate changes in search for new segments. Typically, in a segment, the rate of arrival of features is relatively constant. If the arrival rate changes abruptly and the magnitude of the change is significant, the point of change (or deflection point) is denoted as being a knot (or node), that is, the end of one segment and the beginning of another. For a knot or node to qualify to be a change of segment several characteristics must be true. If the arrival rate is generally erratic, it is concluded that no further segmentation is possible. A similar conclusion is made if there is a change that is relatively small.

In mathematical terms, a segment contains data that is closely approximated by linear splines with free knots. The knots are the breaks (or deflection points) between the segments. Computing a piecewise least-square fit to the segment identifies the knot positions. No further investigation is made if it is a close fit. If the fit is not close, but the arrival rate is erratic (this may be deduced by checking for changes in sign of consecutive residuals) no further segmentation is done. In addition, the segment has to be sufficiently long. It is reasonable to assume that segments of interest have a minimum length, of for example, a couple of minutes. Consequently, such segments contain a minimum number of data points, say n. This implies that only segments with 2n or more data points/features are considered.

The following algorithm can be applied to candidate segments. Segments with 3n−1 or fewer data points are identified. Such sections can have at most one knot. To locate the knot, an extrapolation, using the good fit, is carried out to check whether it fits the adjacent data point. If it does, the fit is extended to include that data point and the process of considering the next data point to extend the fit is repeated.

The process of extending the linear fit terminates as it was already ascertained that a good fit to the whole data is not possible. A similar process can be applied with two free knots by dividing the segment into three sub-segments of equal length. One segment must be a good fit and it can be extended to identify at least one knot (both knots if it is the middle section). Once one knot has been identified, and the best fit was not in the middle segment, we only need to analyze the segments with the bad linear fits. The length of this segment is such that can have at most one knot, and we can apply the procedure described above that handles this case.

A more detailed description of this second-pass segmentation process is illustrated in FIG. 9, with FIGS. 10 through 14 illustrating the application of the second-pass segmentation algorithm to exemplary sample cases.

The first and second-pass segmentation processes of the present algorithm compute all possible candidate segments of the video content. That is, they define segmentation at its finest granularity. After these steps, no further splitting of segments is performed. The third segmentation module 125 implements the next content-based method. This module 125 can be viewed as a validation step to improve the previous segmentation steps, aiming at removing boundaries that might have been spuriously introduced by the first segmentation step between adjacent, topically similar segments.

This content-based method implemented by the third segmentation module 125 examines the distribution of features within each segment. If the set of features that occurred in adjacent segments are nearly the same, this indicates that these segments cover the same topic, and they should be merged into one topically cohesive segment. For each segment, this method defines the support set to be the set of features that occurred in the segment.

The content-based method analyzes the intersection of the support set corresponding to contiguous segments, taking into account that not all features bear the same weight, and that the phonetic retrieval engine will provide different scoring for the different occurrences of a feature in the transcript. For example, if two segments share 80% of the top three features with high retrieval scoring, then they should be merged. However, if the intersection of the support sets mainly lies on low-ranked features, the method conservatively keeps the segment boundaries.

The third segmentation module 125 implements a content-based segmentation process that can be viewed as a validation step to improve on the initial segmentation by the first and second segmentation modules 120, 122, respectively. As summary of what was described earlier, the first and second segmentation modules 120, 122 computed all possible candidate segments of the input signal content. That is, they defined the segmentation at its finest granularity. After this step no further splitting of segments is necessary. An important objective of the third segmentation module 125 is to remove boundaries that have been spuriously introduced by the first and second segmentation modules 120, 122, between adjacent segments that are topically similar.

This content-based method examines the distribution of features within each segment. If the features that are observed in adjacent segments are nearly the same (or similar), this indicates that these segments cover the same topic, and they should be merged into a single topically cohesive segment. For each segment, a support set is defined to be the set of features that occurred in that segment.

Figure 5:
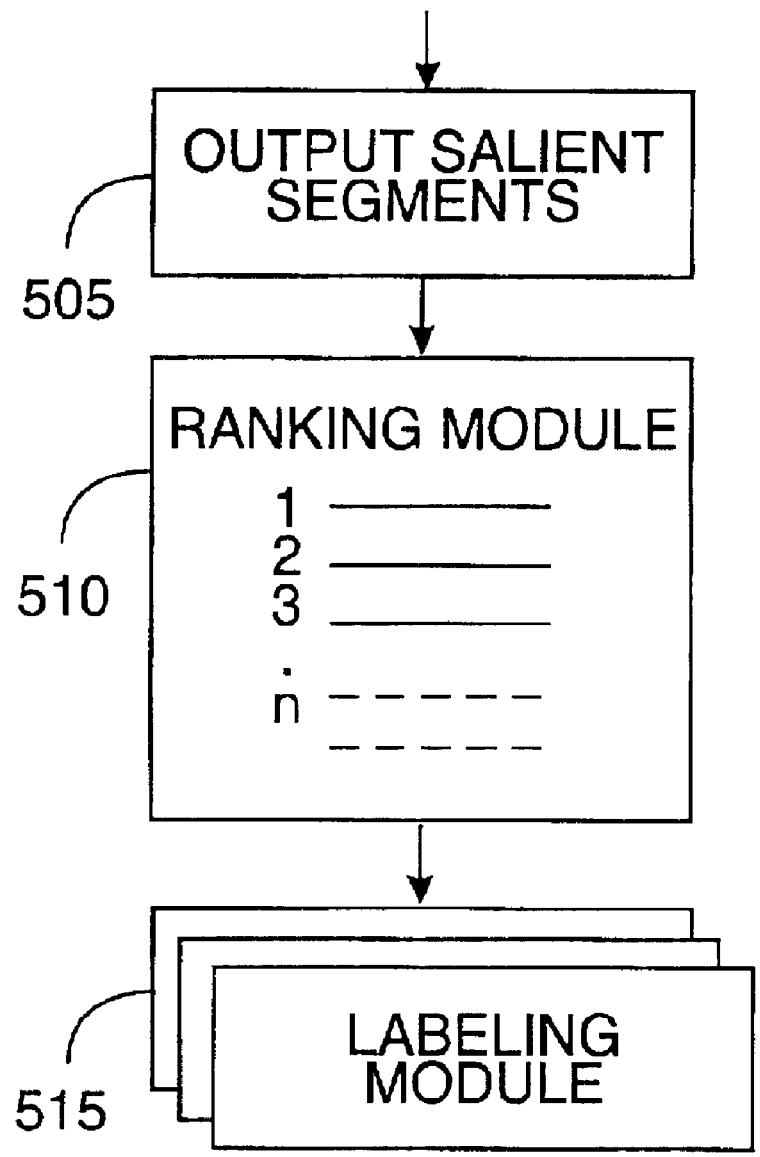
FIG. 5 is a high level block diagram illustrating a processing system of the segmentation system the output of the segmentation system of FIG. 1, that processes the salient segments output by the segmentation system of FIG. 4, showing a ranking module and a labeling module.

Referring now to FIG. 5. The salient segments from the segmentation module 400 of FIG. 4 are identified in the following manner. The intersection of the support set corresponding to contiguous segments is analyzed, taking into account that not all features bear the same weight, and that the phonetic retrieval engine will provide different scoring for the different occurrences of a feature in the transcript. For example, if two segments share 80% of the top three features with high retrieval scoring, then they should be merged. However, if the intersection of the support sets mainly lies on low-ranked features, the segment boundaries are conservatively kept.

A ranking module 510 computes a relevancy score associated with each segment that provides a measure of both the saliency of the topic discussed in the segment and the confidence level associated with the topic. The saliency is computed based on the temporal proximity of the word n-gram features. The confidence associated with the topic is based on the confidence level associated with the recognition of the word n-gram feature. The confidence of an n-gram word feature is based on term-weighting corresponding to each feature observed in the transcript which specifies the probability of occurrence of the feature in the audio. For a given segment, $S_i$, the relevance score is computed by the following equation $$R(S_i) = \left(\frac{1}{L_i}\right) \underset{k=1}{\overset{N_i}{S}} c(f_k) \cdot \left(\underset{j=1}{\overset{m_k}{S}} p(t_{kj})\right), \text{ where}$$

$S_i$ is the i-th speech segment,
$R(S_i)$ is the rank of the i-th speech segment,
$L_i$ is the length of the i-th speech segment,
$f_k$ is the k-th feature within segment $S_i$ The foregoing equation provides a score for each segment where the highest scoring segment corresponds to the most important topic discussed in the input source.

A labeling module 515 computes candidate labels for the most salient segment once the final segmentation has been generated and every segment has been ranked. The labeling module 515 analyzes the distribution of the features within each segment and further analyzes the segments separately. That is, each segment is regarded as a separate document and the feature extraction method is applied by the feature extractor 240 (FIG. 2).

In some instances, new features can emerge indicating the relevance to the local segment but not as important to the whole transcript. Also, statistics on local frequency of non-stop words within the segment are collected. A ranked list of candidate labels is generated from combining the global word n-grams, local word n-grams and relevant content words. For sparse or transitions segments, it might not be possible to generate a meaningful label. The first and last segments of the transcript are treated differently since within these segments the speakers tend to provide an introduction and conclusion of the material, which is hard to label automatically.

An important feature of the present invention is the ability to automatically segment the input audio signal and to allocate an expressive textual label to each segment. Optimally, it is an object of the present invention to find the query/document similarity scores, which, when used as a threshold, maximize the user utility over the labeled documents in a sorted list returned by the ranking module (or engine) 510. This labeling generates tables of contents, audio or audio-visual abstracts, summaries, and browsing automatically.

Figure 8:
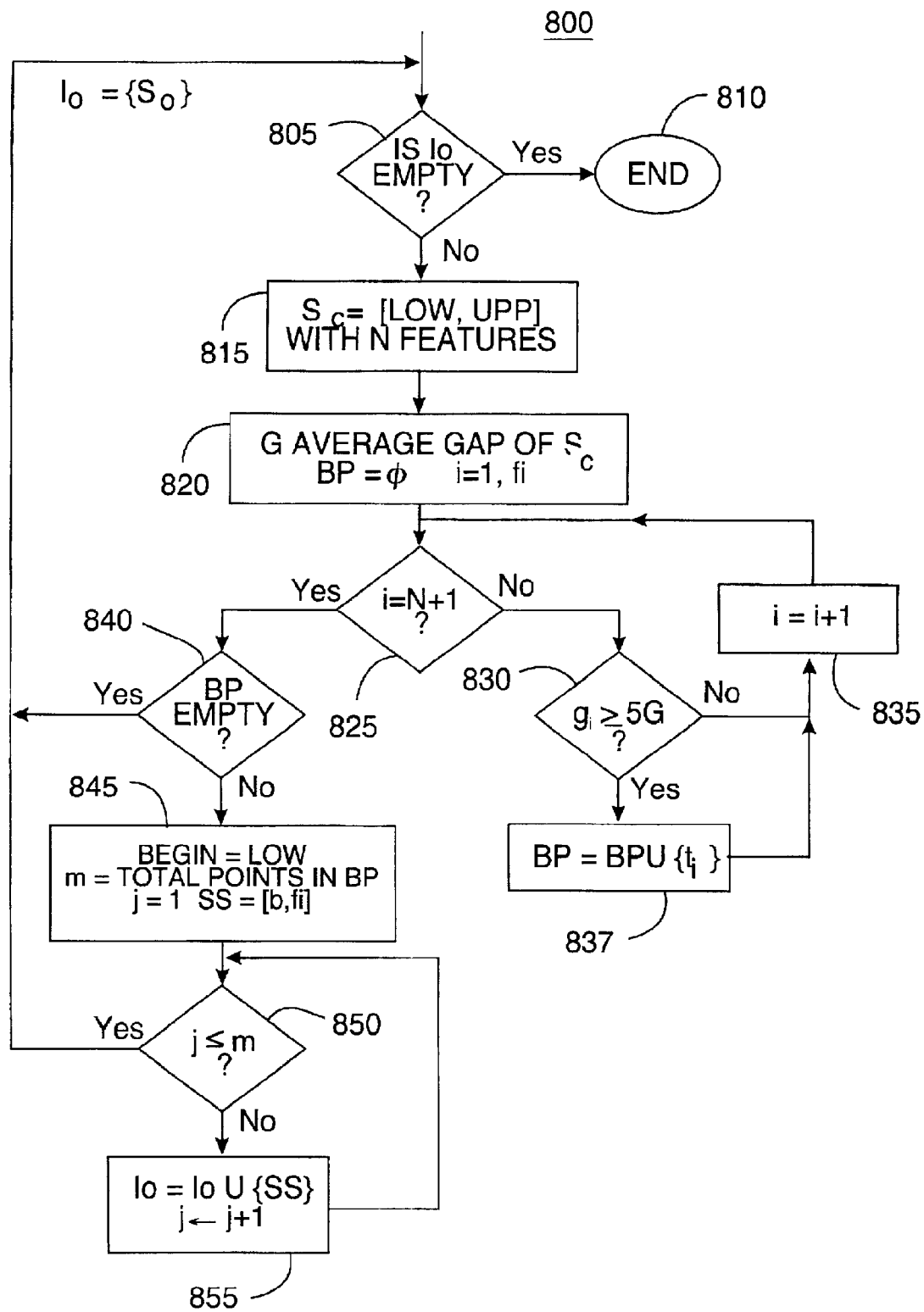
FIG. 8 is a flow chart illustrating a first-pass segmentation process implemented by the segmentation system of FIG. 4.
Figure 9A:
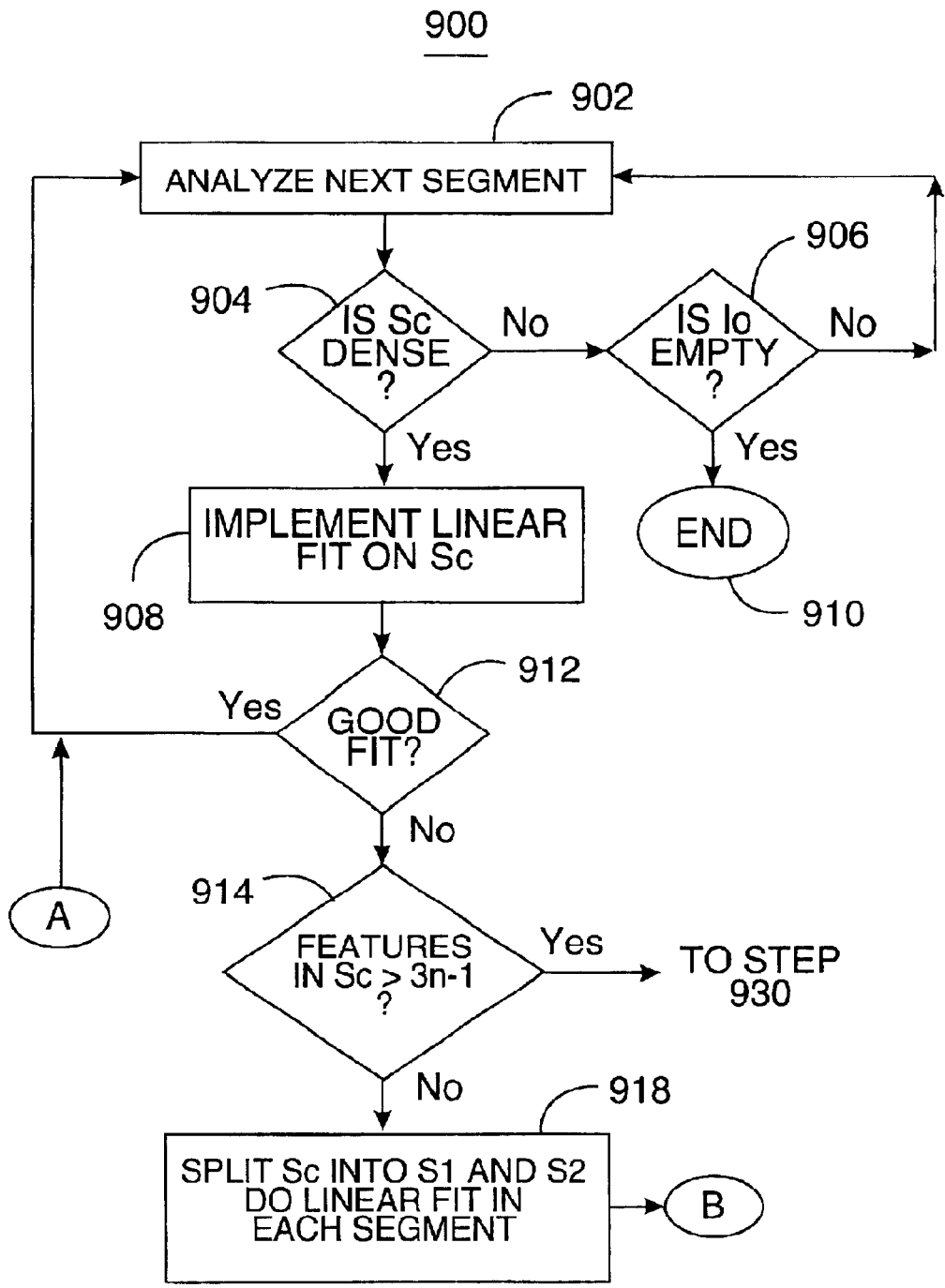
FIG. 9 is comprised of FIGS. 9A, 9B, 9C, and 9D, and is a flow chart that illustrates a second-pass segmentation process implemented by the segmentation system of FIG. 4.
Figure 9B:
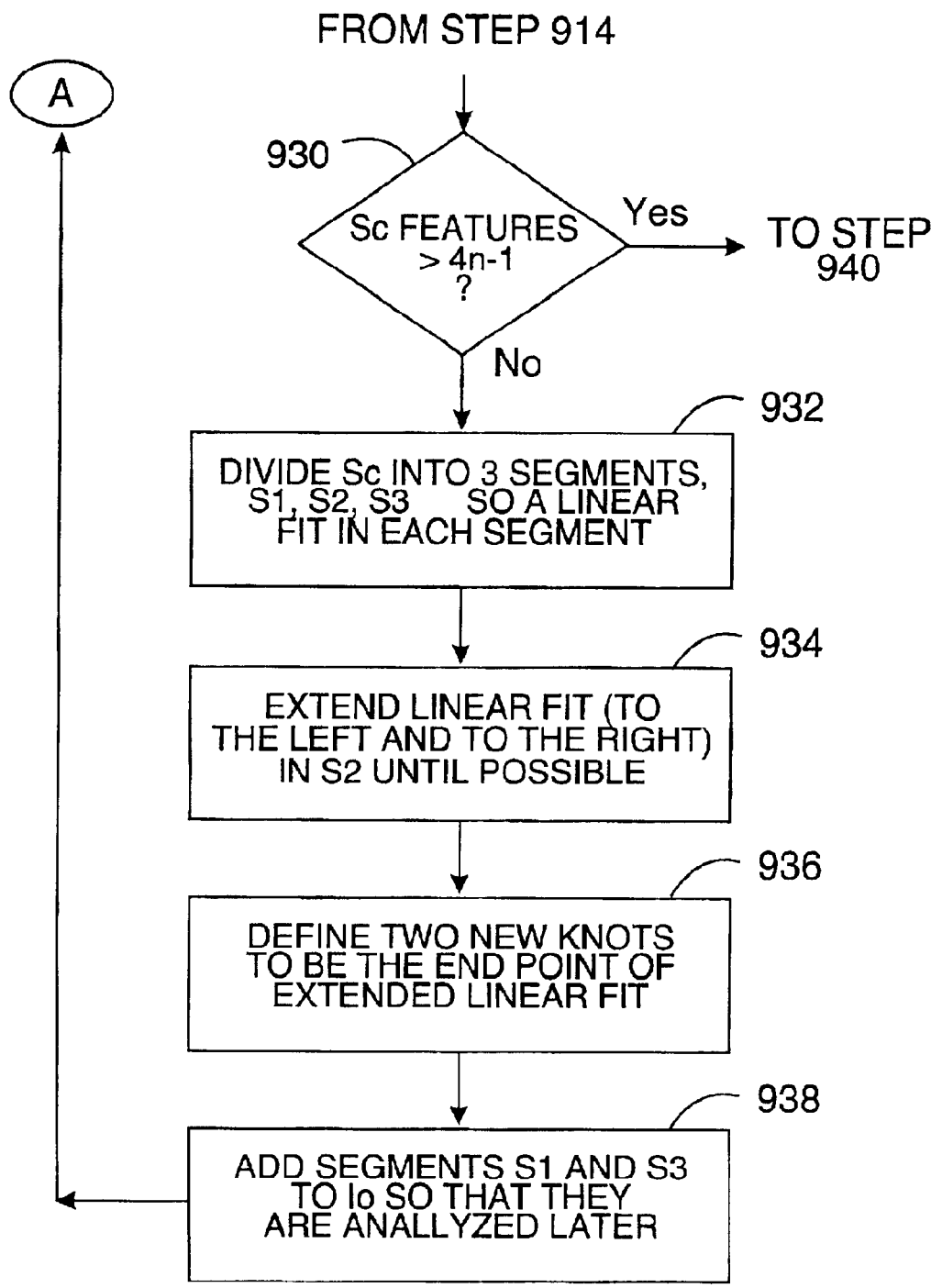
Figure 9C:
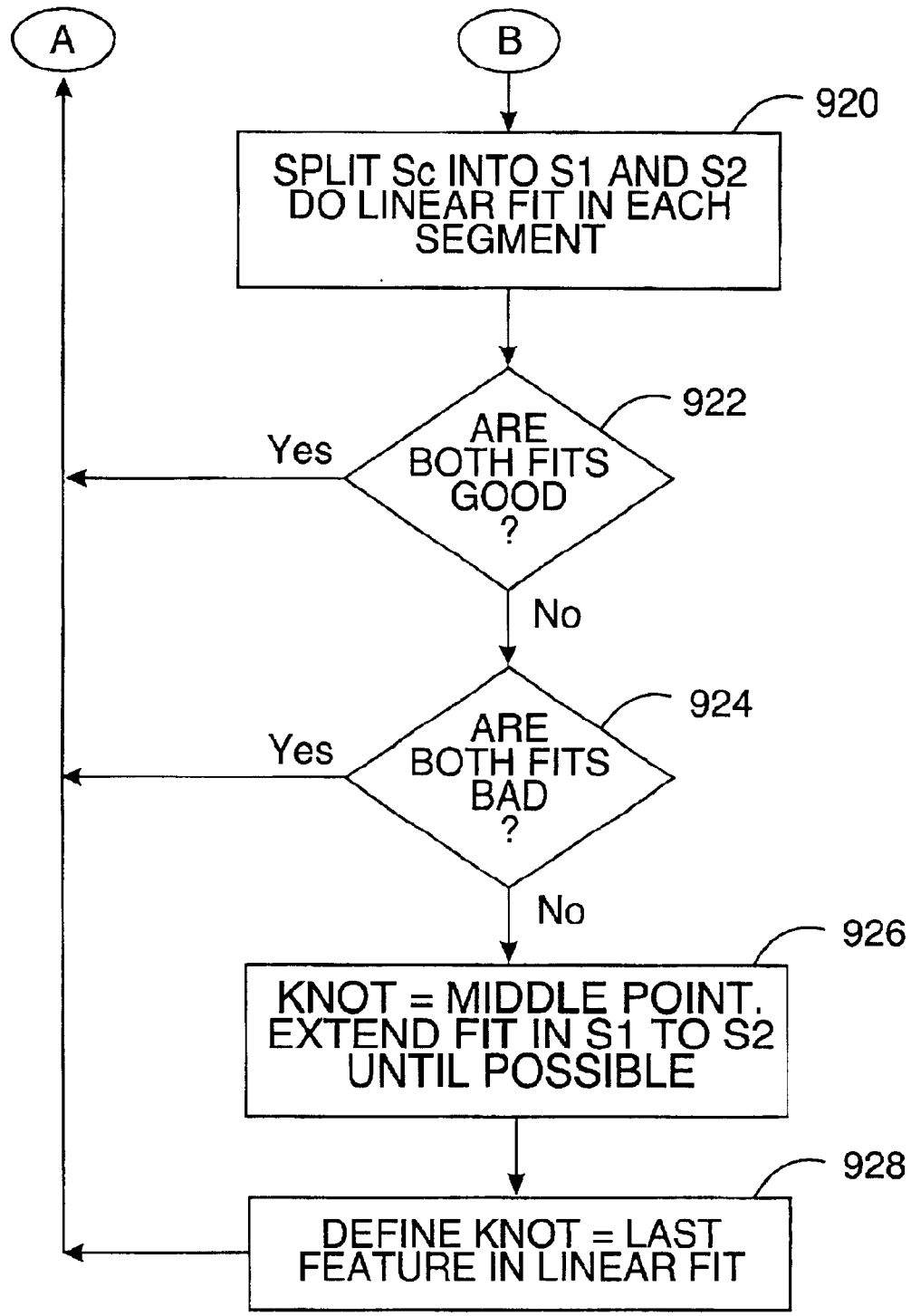
Figure 9D:
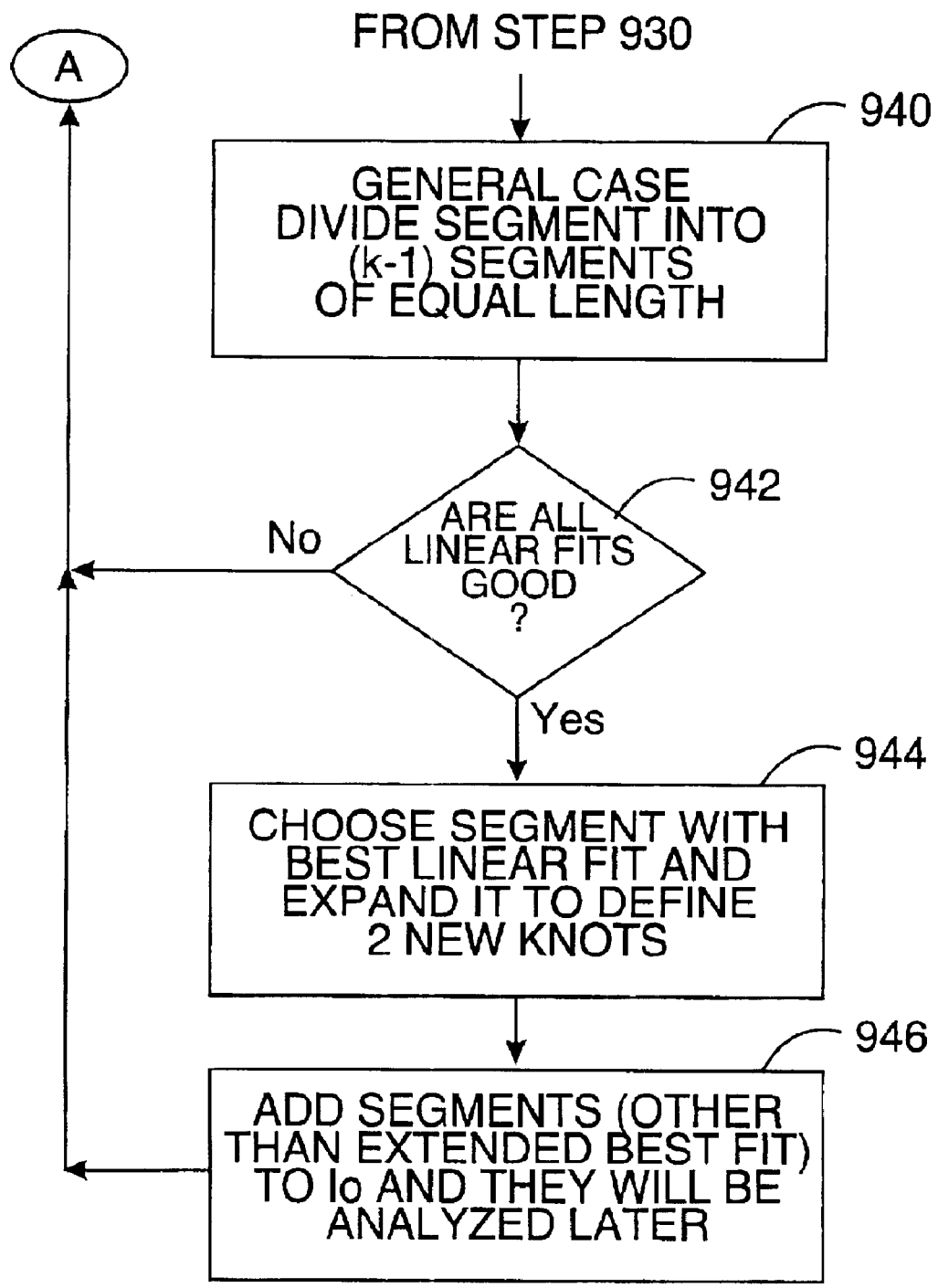
Figure 10:
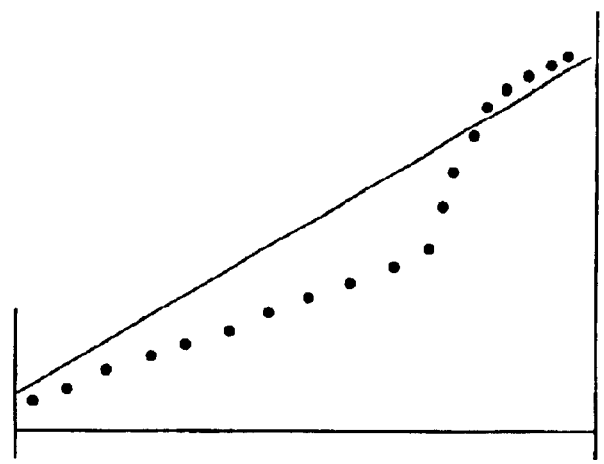
FIGS. 10 through 14 illustrate examples of the second-pass segmentation process of FIG. 9.
Figure 11:
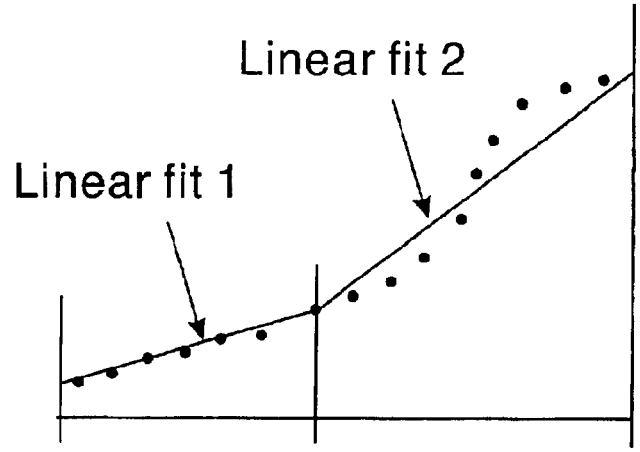

Referring now to FIG. 8, it illustrates an exemplary first-pass segmentation process 800 implemented by the segmentation system of FIG. 4. In FIG. 8, $S_0$ denotes the whole segment to be analyzed, $S_c$ denotes the current segment being analyzed, and $I_0$ denotes the set of segments that need to be analyzed. Process 800 starts with an initial set $I_0=\{S_0\}$. Method 800 starts at decision step 805 and inquire if $I_0$ is empty, i.e., if there are still segments to be analyzed, and then continues to step 815 if $I_0$ is not empty, otherwise process 800 is terminated at 810.

At step 815, process 800 removes a segment from $I_0$, and denotes the remaining set as the current segment, $S_c$ being analyzed. The end points of the segment defined by $S_c$ are denoted as [low, upp] where low stands for lower bound, and upp stands for upper bound. In this example, segment $S_c$ includes N features, that is, $f_i$, i=1, . . . , N, such that, $f_{N+1}$=upp.

At step 820, process 800 computes the average gap of the current segment $S_c$ and defines BP to be a set of time stamps containing the Break Points (BP) found while analyzing the current segment $S_c$. Initially, BP is empty for the current segment, that is, so far we have not identified any 'break points' in the current segment.

At steps 825 and 840, process 800 returned to step 805 and repeats the steps 815, and 820 for all features in the current segment $S_c$.

At step 830, process 800 computes the gap between feature $f_i$ and $f_{i+1}$, and denotes it $g_i$, and then inquires if the gap $g_i$ is greater than a predetermined threshold value, such as a multiple of the average gap G in the current segment, for example $g_i \geq 5\overline{G}$. If the condition at step 830 is satisfied, process 800 proceeds to step 837 and sets (or identifies) a corresponding break point BP. It also adds a time 't' coordinate associated to $f_{i+1}$ to the set BP of break points, and then loops back to step 825 via the incremental step 835.

At step 825, if i≦N process 800 proceeds to step 830, else it proceeds to step 840 where it inquires if BP is empty. If BP is empty, process 800 implies that no further partitioning of the current segment $S_c$ is possible, and returns to step 805 as explained earlier.

Otherwise, if BP is not empty, process 800 implies that the current segment $S_c$ was divided in several sub-segments, and continues to step 845 where it computes those sub-segments and adds them to set $I_0$ for further analysis. Process 800 sets begin=low, that is it defines the beginning or left-hand-side of the segments we will start splitting into sub-segments after we just computed the breaking points defining the boundaries of such sub-segments. For every point in the break point list BP process 800 repeats steps 850 and 855, where it defines a new sub-segment SS=[begin,$f_i$] and set begin=$f_i$. Process 800 then includes the new sub-segment SS to the list of segments, $I_0$ that needs further analysis. Once this loop ends, process 800 returns to step 805 and proceeds as explained earlier.

Returning now to FIG. 9, it illustrates an exemplary second-pass segmentation process 900 implemented by the segmentation system of FIG. 4. Process 900 defines the number of features that a minimum length segment must have and denotes it as n. In this example, process will only consider intervals that have, for instance 2n or more features.

At step 902, process 900 considers the next segment, and determines, at step 904, if this next segment is dense, that is if it not a gap or a generalized gap. For every dense segment, process 900 proceeds to step 908, and starts the analysis of the dense segment. If, however, it is determined at step 906 that there are no more dense segments to analyze, process 900 is terminated at step 910, and the second-pass segmentation process is completed.

At step 908, process 900 implements a linear fit on the whole current segment $S_c$ being analyzed. If the linear fit on the segment $S_c$ is determined at step 912 to be a good fit, no further analysis is needed, and process 900 returns to step 902 to analyze the next dense segment. Otherwise, process 900 proceeds to step 914 (refer to the example in FIG. 10).

At step 914, process 900 inquires if the current segment $S_c$ has more than a predetermined threshold of features, such as 3n−1 features. If it does not, process 900 continues to step 918,where it considers that in this case, segment $S_c$ has more than 2n and less 3n features. Hence, segment $S_c$ can only be split in two sub-segments, i.e., it has as most one knot (refer to the example in FIG. 11). In this example, it will be assumed that the knot is in the middle of the segment.

At step 920, process 900 split the current segment $S_c$ into two sub-segments $S_1$ and $S_2$ and performs a linear fit (i.e., fits a line to) for each of these two sub-segments $S_1$ and $S_2$. Process 900 then proceeds to decision step 922, where it checks if both of these fits are good. If so, the knot lies in the middle and process 900 returns to step 902 as explained earlier to analyze the next dense segment.

If at step 922 it is determined that both fits are not good, process 900 determines that the current segment $S_c$ is a dense segment with erratic features so that no piece-wise linear fit can be done and complies with the minimum length segment, and returns to step 902 as explained earlier to analyze the next dense segment.

Figure 12:
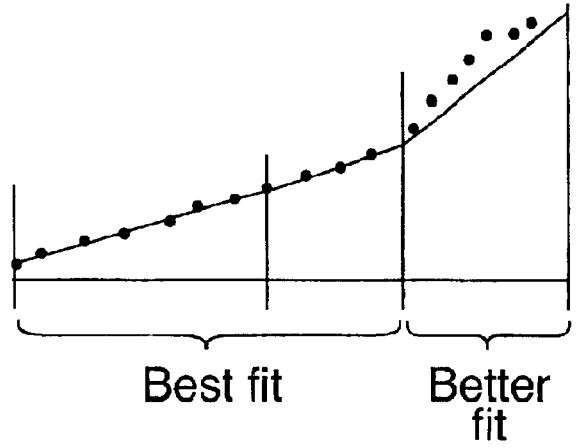
Figure 13:
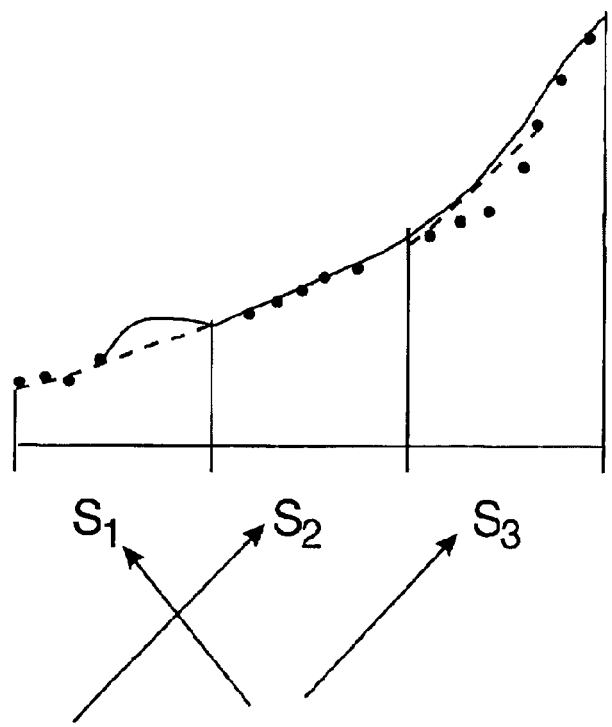
Figure 14:
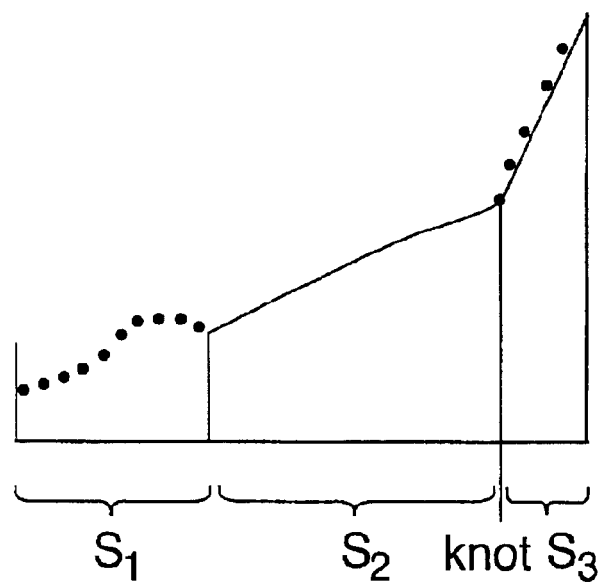

If at step 922 it is determined that not both fits are bad, that is if one linear fit is a good fit, for example sub-segment $S_1$ has a good fit, process 900 extends the fit in sub-segment $S_1$, at step 926, to incorporate features in the adjacent sub-segment $S_2$ (for an illustrative example, refer to FIG. 12). In other terms, process 900 considers the closest feature in sub-segment $S_2$, then evaluates if the linear fit in sub-segment S1 can include this feature. If so, process 900 extends $S_1$ to include such feature. This step is repeated until a feature is found such that the linear fit in sub-segment $S_1$ is not appropriate. This latter condition must occur since process 900 initially checked that one line cannot fit the whole segment $S_c$.

At step 928, process 900 determines that the feature found is precisely the knot where the sub-segment $S_1$ should end. There is no need to further examine sub-segment $S_2$ since it is a small enough segment, and process 900 returns to step 902 as explained earlier to analyze the next dense segment.

If at step 914, process 900 determines that the current segment $S_c$ has more than a predetermined threshold of features, such as 3n–1 features, it proceeds to decision step 930, where it inquires if the current segment $S_c$ has more than 4n–1 features, if so, continues to step 940, as it will be explained later.

Otherwise, if the current segment $S_c$ has more than 3n–1 but less than 4n features, it is considered to have at most two knots, and process 900 continues to step 932, where it divides the current segment $S_c$ into 3 equal-length sub-segments, $S_1, S_2$ and $S_3$. It should be noted that there is no good linear fit for the whole interval. Process 900 then does a linear fit for each of the three sub-segments $S_1, S_2, S_3$, and selects the sub-segment with the best linear fit, for example, sub-segment $S_2$ (for an illustrative example refer to FIG. 13).

Process 900 extends the sub-segment $S_2$ to the left and to the right by examining features in adjacent sub-segments $S_1$ and $S_3$, and implements steps analogous to steps 926 and 928, for each adjacent segment, until it cannot extend the fit any longer, that is, it has found two knots. The end points of the extended segment are defined to be the knots that determine the splitting of the current segment $S_c$ (for an illustrative example, refer to FIG. 14).

At step 938, sub-segments $S_1$ and $S_3$ are added to the list of dense segments, and will now be treated by process 800 as segments that have less than, or equal to 3n features. Process 900 then returns to step 902 as explained earlier to analyze the next dense segment.

Returning to step 930, if it is determined that the current segment has more than kn–1 features, for example, there are the following number of features: (k–1)n ≦features<kn, process 900 proceeds to step 940, and divides the segment into (k–1) sub-segments of equal length, and implements a linear fit to every sub-segment.

If at decision step 942, it is determined that all the fits are poor, process 900 returns to step 902 as explained earlier to analyze the next dense segment. Otherwise, at step 944, process 900 selects the sub-segment with the best fit, for example $S_{k-3}$ and tries to extend the fit left and right (expanding the beginning and end of $S_{k-3}$) towards the adjacent sub-segments to define the new knots identified by this extension. These new knots divide the current segment into sub-segments of smaller size.

At step 946, it is no longer necessary to analyze segment $S_{k-3}$. Process 900 defines two new segments to be analyzed, adds them to set $I_0$ and returns to step 902 as explained earlier to analyze the next dense segment. If $S_{k-3}$=[l,u], and the current segment is $S_c$=[begin,end] ($S_{k-3}$ is a sub-segment $S_c$), then the two new sub-segments are $S_{left}$=[begin,l] and $S_{right}$=[u,end].

It is to be understood that the specific embodiments of the invention that have been described are merely illustrative of certain application of the principle of the present invention. Numerous modifications may be made without departing from the spirit and scope of the present invention.

What is claimed is:

1. A method automatically discovering salient segments in a speech transcript, comprising:

performing a first segmentation of the speech transcript using a boundary-based process to generate a sequence of first segments, indicative of a temporal proximity of features in the speech;

performing a second segmentation of the first segments for determining a rate of arrival of the features, and for generating a sequence of second segments; and performing a third segmentation of the second segments using a content-based process to generate a sequence of third segments, to minimize oversegmentation.

2. The method of claim 1, wherein performing the third segmentation comprises performing segmentation of adjacent segments.

3. The method of claim 2, wherein the speech transcript contains audio data.

4. The method of claim 2, wherein the speech transcript contains video data.

5. The method of claim 4, wherein performing the first segmentation comprises using n-grams for the video data and a mixture of n-grams and content words and noun phrases as a feature set to reduce noise features.

6. The method of claim 1, wherein the features comprise technical terms.

7. The method of claim 1, further comprising modifying the features based on a genre of input data in the speech transcript.

8. The method of claim 2, wherein performing the third segmentation comprises merging at least some of the second segments.

9. A computer program for automatically discovering salient segments in a speech transcript, comprising:

a first set of program instructions for performing a first segmentation of the speech transcript using a boundary-based process to generate a sequence of first segments, indicative of a temporal proximity of features in the speech;

a second set of program instructions for performing a second segmentation of the first segments for determining a rate of arrival of the features, and for generating a sequence of second segments; and a third set of program instructions for performing a third segmentation of the second segments using a content-based process to generate a sequence of third segments, to minimize oversegmentation.

10. The computer program of claim 9, wherein the third set of program instructions merges at least some adjacent second segments.

11. The computer program of claim 10, wherein the speech transcript contains audio data.

12. The computer program of claim 10, wherein the speech transcript contains video data.

13. The computer program of claim 9, wherein the features comprise technical terms.

14. A system for automatically discovering salient segments in a speech transcript, comprising:

means for performing a first segmentation of the speech transcript using a boundary-based process to generate a sequence of first segments, indicative of a temporal proximity of features in the speech;

means for performing a second segmentation of the first segments for determining a rate of arrival of the features, and for generating a sequence of second segments; and means for performing a third segmentation of the second segments using a content-based process to generate a sequence of third segments, to minimize oversegmentation.

15. The system of claim 14, wherein the means for performing the third segmentation merges at least some adjacent second segments.

16. The system of claim 15, wherein the speech transcript contains audio data.

17. The system of claim 15, wherein the speech transcript contains video data.

18. The system of claim 14, wherein the features comprise technical terms.

19. The system of claim 14, wherein the features comprise word n-grams.

20. The system of claim 19, wherein the first and second segmentations compute a maximum number of segments to be discovered.

21. A method automatically discovering salient segments in a time varying signal, comprising:

performing a first segmentation of the time varying signal using a boundary-based process to generate a sequence of first segments, indicative of a temporal proximity of features in the speech;

performing a second segmentation of the first segments for determining a rate of arrival of the features, and for generating a sequence of second segments; and performing a third segmentation of the second segments using a content-based process to generate a sequence of third segments, to minimize oversegmentation.

22. The method of claim 21, wherein the time varying signal includes a visual component.

* * * * *